April 4, 1961  H. L. BARNEY  2,978,672
HYDROPHONE
Filed April 25, 1951

INVENTOR
H. L. BARNEY
BY Harry C. Hart
ATTORNEY

2,978,672
HYDROPHONE

Harold L. Barney, Madison, N.J., assignor to Bell Telephone Laboratories, Incorporated, New York, N.Y., a corporation of New York Filed Apr. 25, 1951, Ser. No. 222,878

2 Claims. (Cl. 340—14)

This invention relates to submarine signaling and has for its principal object the recovery of acoustical vibrations of very low frequencies which occur in sea water, being generated, for example, by the movements of seagoing vessels and of objects or apparatus within them.

In the past, the designer of a subaqueous microphone or hydrophone has been confronted by the problem of maintaining its sensitivity to audio frequencies or a fair fraction thereof despite the wide variations of hydrostatic pressure which the hydrophone encounters by reason of submersion to a considerable depth below the surface of the water.

Each increase of 34 feet in the depth of the hydrophone below the surface of the sea results in an increase of an atmosphere in the pressure to which it is subjected so that when the unit is submerged to a depth of 300 feet or so below the surface, it must be able to operate under a hydrostatic pressure of 120 pounds per square inch or more, i.e., a pressure which is many thousands of times greater than that of any acoustical vibration to be picked up.

In connection with the investigation of vibrations of a certain class, such as are generated, for example, by the movements of seagoing vessels and of objects within them, it becomes necessary to recover acoustic vibrations of frequencies which lie well below the audio range, as low, indeed, as $1/10$ cycle per second or less. It is still more difficult to maintain the sensitivity of the hydrophone to such low frequencies despite submersion than it is to maintain its audio frequency sensitivity.

In order that the hydrophone shall respond to vibratory pressures of small amplitude, its diaphragm must be a delicate membrane. But such a delicate membrane would inevitably be ruptured by the large hydrostatic pressures to which the hydrophone is subjected, if these pressures were not somehow compensated, as by balancing them by equal and opposite fluid pressures applied to the rear face of the diaphragm.

It has been customary in the past to provide such pressure equalization as between the front and rear faces of the diaphragm by admitting air or water into the chamber which is bounded by the diaphragm under suitable pressure. One way of building up the necessary back pressure is by admitting water through a constricted passage or "labyrinth" through which the water may leak under the action of the difference between the external pressure and the internal pressure until these pressures have been equalized. But the dimensions of this passage determine the low frequency cut-off of the device and, in order that a useful amount of sensitivity may be retained at the very low frequencies now of interest, e.g., frequencies of the order of $1/10$ cycle per second and even less, the resistance to the passage of a fluid through this labyrinth must be so exceedingly high that the process of submerging the hydrophone to the desired depth in the sea must be carried out with the utmost care and deliberation. The conditions under which instruments of this kind find their greatest usefulness call for rapid action both in the case of submersion and in the case of withdrawing the hydrophone from the water. The consequent rapid changes of hydrostatic pressure on the diaphragm, if it is as delicate as a high degree of sensitivity requires, would in all likelihood rupture it.

In accordance with the present invention, there are provided automatic pressure-operated valve means for admitting fluid to the rear face of the diaphragm whenever the pressure difference between the two faces exceeds a preassigned threshold and for similarly withdrawing fluid from the rear face of the diaphragm whenever this pressure difference falls below a preassigned threshold. In each case, the threshold is selected at a value somewhat in excess of the largest vibratory pressure difference to be encountered and yet well below the value at which the sensitive diaphragm might be ruptured. With such an arrangement, the valves remain closed while the hydrophone is held at a fixed depth below the surface of the sea, and the sensitive diaphragm responds, by moving the sensitive element of a transducer within it, to vibratory pressures of all frequencies. On the other hand, during the raising or lowering of the hydrophone to various depths below the surface, the resulting pressure difference opens one or other of the automatic valves, and the balancing fluid streams rapidly through the valve seats in a quantity sufficient to maintain an approximate balance against the external pressure of the sea water.

For best operation, exact balance of the internal and external pressures is obtained by the use of a labyrinth through which air of water may leak slowly in a fashion to equalize the pressures exactly, in order that the diaphragm may operate, under the influence of vibratory pressures, about a completely undeflected position. This labyrinth may be so small as to impose substantially no restriction on the low frequency cut-off of the device. Air or water leaks through it much too slowly to permit of reliance on it in the course of submersion or immersion, it being the function of the valves to protect the diaphragm from rupture under these conditions.

The interior face of the diaphragm, which is linked to the sensitive element of a transducer in the customary fashion, is preferably protected from corrosive action of sea water by a partition such as a collapsible rubber sac. The valves may be outside of the sac, in which case they admit and withdraw sea water; or they may equally well be located inside of the sac, in which case they admit or withdraw air, which in turn is compressed by the action of the sea water on the outer surface of the collapsible sac.

The invention will be fully apprehended from the following detailed description of preferred embodiments thereof, taken in connection with the appended drawings, in which.

Figure 1:
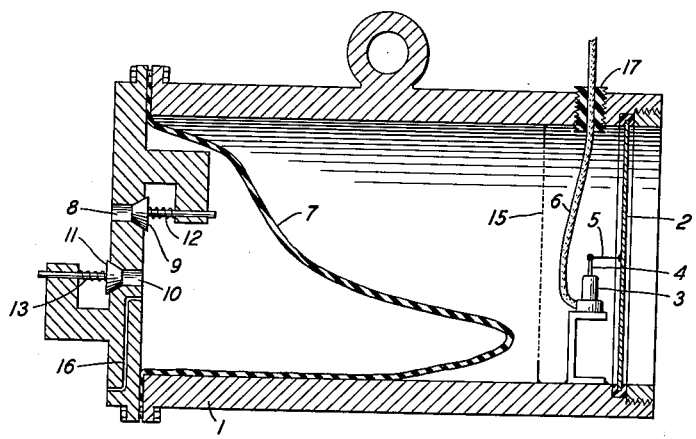
Fig. 1 is a cross-sectional diagram showing the construction of a pressure equalization hydrophone of one form.

Referring now to the drawings, Fig. 1 shows a hydrophone which comprises a rigid casing 1, for example, of heavy steel plate, into one face of which there is fixed a sensitive diaphragm 2, for example, of sheet steel a few mils thick. The diaphragm may be fixed to the casing in well-known fashion by the use of waterproof gaskets and a clamping ring. The body of a transducer 3 of any convenient variety is rigidly mounted within the casing and supported on a bracket fixed to the interior casing wall. The sensitive element 4 of this transducer is linked by a delicate rod 5 to the center of the diaphragm 2. The transducer unit itself may be of any convenient variety. A unit which has been found to be suitable is the so-called mechanoelectronic transducer sold by the Radio Corporation of America under the code number 5734. This unit requires heater current and anode voltage, both of which may be supplied from the operator's station at the surface by way of a cable 6.

At the opposite end of the casing, there is sealed by its mouth a loose rubber sac 7. In that part of the casing wall which is embraced within the rim of the rubber sac 7 are two ports 8, 10, one having a valve seat on the inside and the other a valve seat on the outside of the casing. Each seat is provided with a spring-loaded valve 9, 11 which may be maintained in a centered position with respect to the ports 8, 10 as by passage of its stem through a valve sleeve contained in a bracket fixed to the casing wall. With this construction, when submersion of the hydrophone commences, the pressure of the sea water on the outside of the metal diaphragm 2 soon exceeds the air pressure within the casing. When this excess has exceeded a preassigned amount, determined by the tension of the inlet valve spring 12, the inlet valve 9 opens and admits sea water through the port 8 to the sac 7. The sac 7 begins to fill and compresses the air between the sac and the diaphragm 2, thus maintaining the pressure on the inside face of the sensitive diaphragm equal to that on its outside face except for the threshold value of the pressure difference which is determined by the spring 12. The transducer 3 and its sensitive element 4 may be protected from possible injury by the rubber sac by a grid 15.

When the hydrophone has been submerged to the desired depth and the hydrostatic pressure has thus ceased to increase, the intake valve 9 closes leaving a small pressure difference, of the order of a few ounces per square inch, which is insufficient to hold the intake valve 9 open against the pressure of its spring 12. However, this pressure difference is sufficient to cause sea water to leak slowly through a minute hole or labyrinth 16. This leakage gradually brings the pressure inside the casing into exact equality with the pressure outside of the casing and so permits the diaphragm to operate in its completely undeflected and, therefore, most sensitive position. Before this leakage has been completed, the diaphragm 2 is slightly bowed inward by the excess of external pressure over internal pressure and for that reason it may be slightly reduced in sensitivity. However, it is in no danger of rupture because the pressure threshold at which the intake valve 9 operates is much lower than the breaking strength of the diaphragm.

The hydrophone may now be utilized to pick up sea water vibrations of very small amplitude and exceedingly low frequency, its electrical output being conducted by way of the cable 6 which passes through a bushing 17 in the casing wall to the surface. The impedance of the labyrinth 16 to water passage may be so high that the sensitivity of the hydrophone is maintained down to frequencies as low as 1/10 cycle per second and even lower.

When the operator commences to withdraw the hydrophone from the water by hoisting it to the surface, the pressure exterior to the casing 1 begins to fall. When it has fallen below a preassigned threshold determined by the setting of the exhaust valve spring 13, the exhaust valve 11 opens, and sea water flows out through it under the pressure exerted on the exterior of the collapsible rubber sac 7 of the air inside of the casing.

Figure 3:
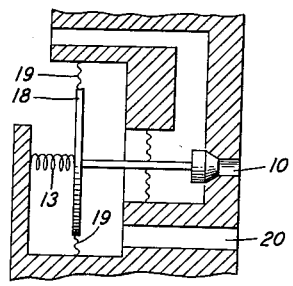
Fig. 3 is a detailed view of a preferred valve construction for use with the hydrophones of Fig. 1 and Fig. 2.

It is desirable that the intake and exhaust valves operate positively on pressure differences as low as a few ounces per square inch; and, accordingly, it is desirable that they incorporate the pressure transformation principle of the hydraulic jack. Fig. 3 shows the details of a valve of this character, the exhaust valve 11 being used as an example. The port 10 in which the valve 11 has its seat may be of the order of one square centimeter in cross section. The valve stem bears on its far end a disc or piston 18 whose area is perhaps 21 square centimeters in cross section and which is connected to the casing walls by flexible membranes 19. The piston 18 is exposed to the pressure inside of the casing 1 by way of a secondary port 20. With this construction, the tension of the loading spring 13 may be, for example, 200 grams. To open the valve 10, a force of more than 200 grams must be generated by the pressure difference. By reason of the large area of the piston 18, however, such a force is obtained when the pressure is only 10 grams per square centimeter. This construction permits of positive action under the influence of springs which are not excessively delicate even though the pressure difference required to open or close the valve be very small.

Figure 2:
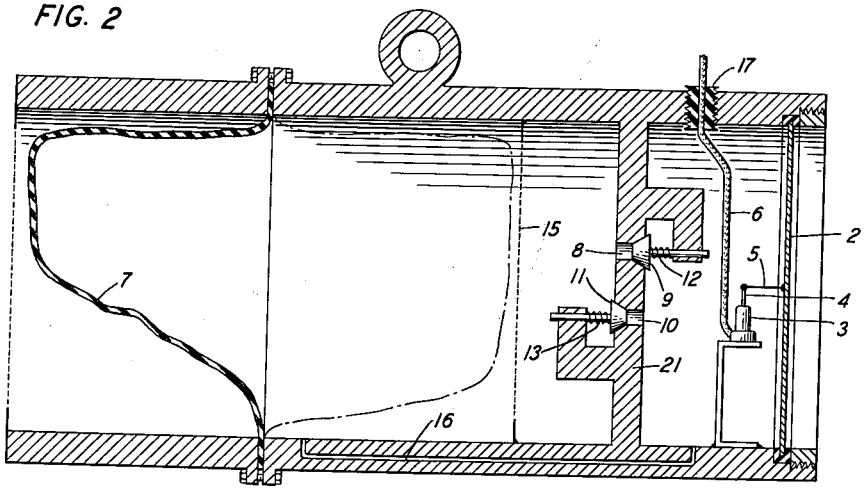
Fig. 2 shows an alternative to Fig. 1.

Fig. 2 shows an alternative to Fig. 1 which differs only in that the ports and valve 8–11, their springs 12, 13, and the labyrinth 16 are placed inside of the sac 7 instead of outside of it. The mouth of the sac is freely open to the sea water. As the sea water enters the sac and fills it, compressing the air inside of the casing 1 and outside of the sac 7, the intake valve 9, which is now located in a partition 21, opens and admits to the rear face of the sensitive diaphragm 2 the air which is contained within the casing 1 and which has now been compressed by the expansion of the rubber sac 7. The opposite action takes place with the exhaust valve 10 when the external pressure is reduced. This construction has the merit that the valves are not exposed to the corrosive action of the sea water, while the labyrinth 16 is protected from danger of being blocked by foreign solid matter.

Various alternatives embodying the principles of the invention will suggest themselves to those skilled in the art. For example, any desired valve construction may be employed. Thus, a single two-way valve serves the purposes of the present invention as well as a pair of one-way valves. The latter have been shown and described because of their great simplicity of construction and as furnishing a good illustration. Again, it may be preferred not to pass either air or sea water through the valves but rather some fluid of intermediate compressibility such as a silicone oil, in which case a reservoir of this medium may be provided within the casing 1 in any desired fashion.

What is claimed is:

1. A hydrophone which comprises a casing having walls defining a closed chamber, a pressure-sensitive diaphragm mounted in a wall of said casing, a transducer having a body and a movement-sensitive element, said transducer body being fixed within said casing, said sensitive element being linked to said diaphragm and movable thereby, a wall of said casing having a labyrinthine passage therein communicating with the interior of said chamber and having also two ports bypassing said passage, a valve normally closing each of said ports, differential pressure-controlled means for opening one of said ports in response to a positive pressure difference between the exterior of said casing and said chamber in excess of a preassigned amount to reduce said pressure difference, and differential pressure-controlled means for opening the other of said ports in response to a negative pressure difference between the exterior of said casing and said chamber in excess of said preassigned amount to reduce said negative pressure difference.

2. A hydrophone which comprises a rigid casing having the form of a hollow cylinder, a pressure-sensitive diaphragm hermetically closing one end of said cylinder, a transducer having a body and a movement-sensitive element, said transducer body being fixed within said casing, said sensitive element being linked to said diaphragm and movable thereby, an extensible waterproof diaphragm hermetically closing the other end of said cylinder, a rigid partition disposed within said casing and intermediate its ends, said partition thus defining two chambers, of which the first is bounded by the partition and the pressure-sensitive diaphragm while the second is bounded by the partition and the extensible diaphragm, said partition being pierced by two ports, a first valve seated in the first port on that side of said partition which faces the pressure-sensitive diaphragm, a spring urging said first valve into its seat, whereby said first port is normally closed and is opened in response to an excess of pressure in said second chamber over that in said first chamber, thereby to permit a rapid flow of air from said second chamber into said first chamber, a second valve seated in said second port on that side of said partition which faces the extensible diaphragm, a spring urging said second valve into its seat, whereby said second port is normally closed and is opened in response to an excess of pressure in said first chamber over that in said second chamber, thereby to permit a rapid flow of air from said first chamber into said second chamber, and a labyrinthine passage bypassing said ports and valves and interconnecting said first and second chambers to permit a slow flow of air from either of said chambers to the other chamber, thereby slowly to equalize the pressures in said chambers in response to pressure differences between them which are of insufficient magnitudes to actuate said valves.

References Cited in the file of this patent

UNITED STATES PATENTS

| | | |
|---|---|---|
| 2,403,535 | Kremer | July 9, 1946 |
| 2,411,865 | Bostwick | Dec. 3, 1946 |
| 2,429,104 | Olson | Oct. 14, 1947 |
| 2,490,595 | Merten | Dec. 6, 1949 |